(12) United States Patent
Shila et al.

(10) Patent No.: US 10,127,485 B2
(45) Date of Patent: Nov. 13, 2018

(54) ONION LAYER ENCRYPTION SCHEME FOR SECURE MULTI-ACCESS WITH SINGLE CARD

(71) Applicant: CARRIER CORPORATION, Farmington, CT (US)

(72) Inventors: Devu Manikantan Shila, East Hartford, CT (US); Penghe Geng, Vernon, CT (US); Vijaya Ramaraju Lakamraju, Avon, CT (US); Nicholas Charles Soldner, Mountainview, CA (US); Alan Marchiori, East Hartford, CT (US)

(73) Assignee: Carrier Corporation, Palm Beach Gardens, FL (US)

( * ) Notice: Subject to any disclaimer, the term of this patent is extended or adjusted under 35 U.S.C. 154(b) by 199 days.

(21) Appl. No.: 15/195,002

(22) Filed: Jun. 28, 2016

(65) Prior Publication Data

US 2017/0098147 A1 Apr. 6, 2017

Related U.S. Application Data

(60) Provisional application No. 62/187,455, filed on Jul. 1, 2015.

(51) Int. Cl.
| | |
|---|---|
| *G06K 19/06* | (2006.01) |
| *G06Q 20/34* | (2012.01) |
| *G07C 9/00* | (2006.01) |
| *G07F 7/08* | (2006.01) |
| *G07F 7/12* | (2006.01) |
| *H04L 9/14* | (2006.01) |

(52) U.S. Cl.
CPC ..... *G06K 19/06187* (2013.01); *G06Q 20/347* (2013.01); *G07C 9/00722* (2013.01); *G07C 9/00904* (2013.01); *G07F 7/0813* (2013.01); *G07F 7/125* (2013.01); *H04L 9/14* (2013.01)

(58) Field of Classification Search
USPC ........................................................ 235/493
See application file for complete search history.

(56) References Cited

U.S. PATENT DOCUMENTS

| | | |
|---|---|---|
| 4,177,657 A | 12/1979 | Aydin |
| 4,213,038 A | 7/1980 | Johnson et al. |
| 4,677,284 A | 6/1987 | Genest |

(Continued)

FOREIGN PATENT DOCUMENTS

| | | |
|---|---|---|
| WO | 2005086832 A2 | 9/2005 |
| WO | 2012019238 A1 | 2/2012 |

OTHER PUBLICATIONS

European Extended Search Report dated Nov. 21, 2016, issued in the corresponding European Patent Application No. 16177408.8.

(Continued)

*Primary Examiner* — Jamara Franklin
(74) *Attorney, Agent, or Firm* — Bachman & LaPointe, P.C.

(57) ABSTRACT

A magnetic strip card includes a partial encrypted card payload encrypted with a long shared key to provide a final encrypted payload. A method for encoding the magnetic strip card includes encrypting a card payload with a code key of a access controls with a short key of the access control to generate a partial encrypted payload and encrypting the partial encrypted payload with a long shared key to provide a final encrypted payload.

15 Claims, 4 Drawing Sheets

(56) References Cited

U.S. PATENT DOCUMENTS

| | | | |
|---|---|---|---|
| 4,837,822 | A | 6/1989 | Crosley et al. |
| 5,420,924 | A | 5/1995 | Berson et al. |
| 5,442,704 | A | 8/1995 | Holtey |
| 5,506,395 | A | 4/1996 | Eppley |
| 6,202,933 | B1 * | 3/2001 | Poore .................... G06K 19/14 235/375 |
| 6,824,066 | B2 | 11/2004 | Weyant |
| 8,340,287 | B2 | 12/2012 | Sandhu et al. |
| 2003/0172280 | A1 | 9/2003 | Scheidt et al. |
| 2005/0077995 | A1 | 4/2005 | Paulsen et al. |
| 2011/0302420 | A1 | 12/2011 | Davida |
| 2012/0060033 | A1 | 3/2012 | Giuliani et al. |

OTHER PUBLICATIONS

Triple Des-Wikipedia, the free encyclopedia; Jun. 17, 2015; XP055321480; http://wikipedia.org; http://web.archive.org/web/20150617195317/https://en.wikipedia.org/wiki/Triple_DES.
University of Victoria; University Policy No. BP3125, Key and Access Card Control; Jan. 2010; http://csrc.nist.gov/groups/STM/cmvp/documents/140-1/140sp/140sp167.pdf.
Spyrus, Inc., 2355 Oakland Road, San Jose, CA 95131, Rosetta Smart Card; Model No. SC410-G; Security Policy, Level 3, Version 1.4, Jun. 20, 2001; http://www.uvic.ca/universitysecretary/assets/docs/policies/BP3125_6735_.pdf.

* cited by examiner

ONION LAYER ENCRYPTION SCHEME FOR SECURE MULTI-ACCESS WITH SINGLE CARD

CROSS REFERENCE TO RELATED APPLICATION

This application claims the benefit of provisional application Ser. No 62/187,455, filed Jul. 1, 2015.

BACKGROUND

The present disclosure relates generally to access control systems, and more particularly, to a system and a method to encrypt Magnetic Strip Cards.

The ubiquitous magnetic strip card is widely used in access control applications such as hotel locks. The magnetic strip cards are typically inexpensive to the point of being a disposable device, however, the magnetic strip cards provide only a relatively small amount of storage space, e.g., several hundred bits and it is often desirable for one card to open multiple locks. Since the magnetic strip card is usually encrypted, a common solution is to use the same encryption key throughout the hotel, so each door lock is able to decipher a card and verify access information. However, this may pose a security risk, as one lock's compromise results in all being compromised.

Alternatively, different encryption keys may be used for each lock. However, the relatively small amount of storage space cannot store the multiple different encrypted copies so as to enable one card to be decryptable by multiple locks.

SUMMARY

A magnetic strip card according to one disclosed non-limiting embodiment of the present disclosure can include a partial encrypted card payload encrypted with a long shared key to provide a final encrypted payload.

A further embodiment of the present disclosure may include, wherein the partial encrypted card payload includes card contents unique to each access control encrypted with a short key.

A further embodiment of any of the embodiments of the present disclosure may include, wherein individual short key portion is different for each key/access control pair.

A further embodiment of any of the embodiments of the present disclosure may include, wherein the final encrypted payload contains individual short key portions for four different key/access control pair.

A further embodiment of any of the embodiments of the present disclosure may include, wherein the short key is 24 bits.

A further embodiment of any of the embodiments of the present disclosure may include, wherein the long shared key is 128 bits.

A further embodiment of any of the embodiments of the present disclosure may include, wherein the partial encrypted card payload is encrypted with a Code Key of an access control with the short key of the access control.

A further embodiment of any of the embodiments of the present disclosure may include, wherein the access control is a lock.

A further embodiment of any of the embodiments of the present disclosure may include, wherein the partial encrypted card payload is associated with a single lock.

A method for encoding an magnetic strip card, the method according to another disclosed non-limiting embodiment of the present disclosure can include encrypting a card payload with a code key of an access control with a short key of the access control to generate a partial encrypted payload and encrypting the partial encrypted payload with a long shared key to provide a final encrypted payload.

A further embodiment of any of the embodiments of the present disclosure may include, wherein the short key is 24 bits.

A further embodiment of any of the embodiments of the present disclosure may include, wherein the long shared key is 128 bits.

A further embodiment of any of the embodiments of the present disclosure may include, wherein the short key is 24 bits and the long shared key is 128 bits.

A further embodiment of any of the embodiments of the present disclosure may include encrypting a card payload with a code key for each of a multiple of access controls with a respective short key of the access control to generate the partial encrypted payload.

A further embodiment of any of the embodiments of the present disclosure may include, wherein the partial encrypted payload includes at least one code key.

A further embodiment of any of the embodiments of the present disclosure may include, wherein the partial encrypted payload includes four code keys.

A further embodiment of any of the embodiments of the present disclosure may include, wherein the partial encrypted payload includes a multiple of code keys.

A method for opening an appropriate access control, the method according to another disclosed non-limiting embodiment of the present disclosure can include decrypting a final encrypted payload with the Long Term Key to access a partial encrypted payload and decrypting the partial encrypted payload.

A further embodiment of any of the embodiments of the present disclosure may include, wherein decrypting the partial encrypted payload includes applying a short key to a multiple of code keys.

A further embodiment of any of the embodiments of the present disclosure may include, wherein applying the short key to the multiple of code keys is operable to decrypt only one access control code key successfully while the remainder of the multiple of code keys produces un-meaningful output such that the remainder of the code keys remain encrypted.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
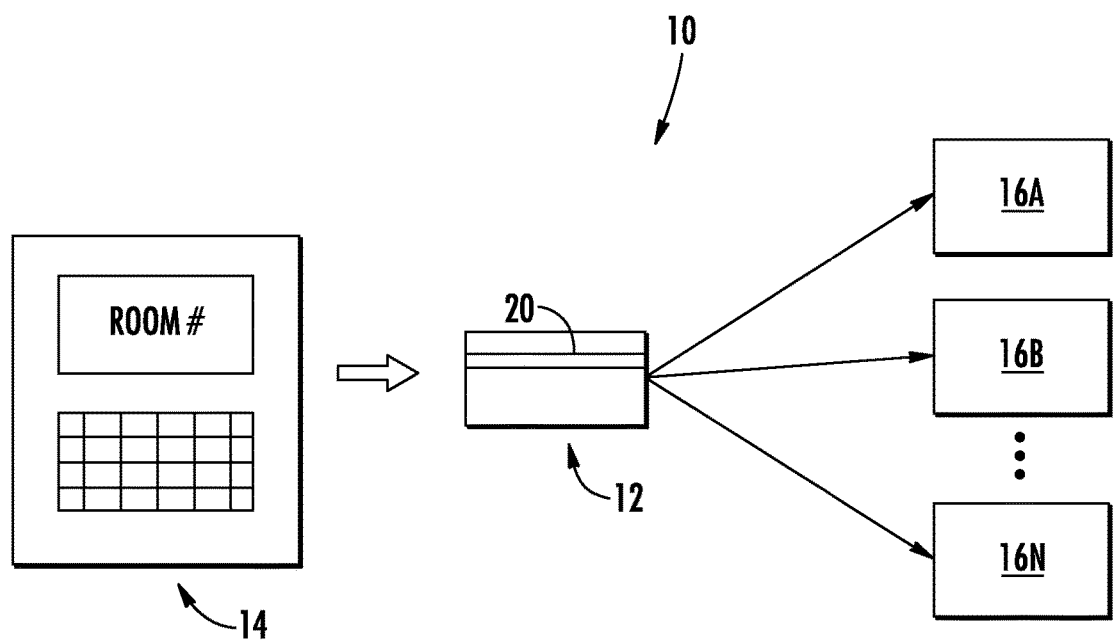
FIG. 1 is a general schematic system diagram of an access control system.

FIG. 1 schematically illustrates an access control system 10. The system 10 generally includes a magnetic strip card (magnetic strip card) 12, an encoder 14, and a plurality of access controls 16, schematically illustrated as 16a, 16b, . . . , 16n. The encoder 14 operates to encode the magnetic strip card 12 with a payload 20 for the appropriate access controls 16, e.g. lock, safe, reader, etc. It should be appreciated that, although particular systems are separately defined in the schematic block diagrams, each or any of the systems may be otherwise combined or separated via hardware and/or software.

Figure 2:
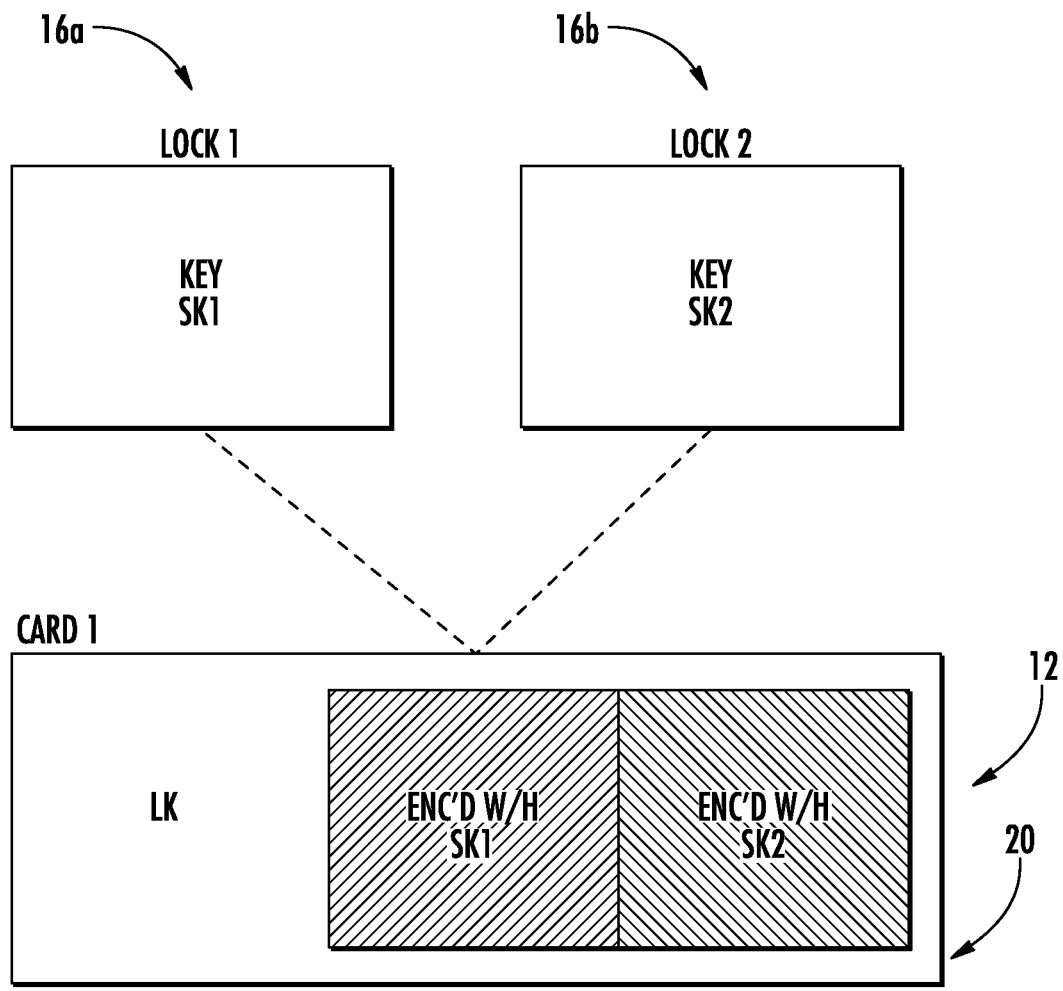
FIG. 2 is a block diagram of a magnetic strip card payload with layers of encryption which may be referred to as an onion-layer encryption.

With reference to FIG. 2, the magnetic strip card 12 is typically a disposable device that provides only a relatively small amount of storage space for the card payload, e.g., several hundred bits. The encoder 14 operates to encode the magnetic strip card 12 with a payload 20 for the appropriate access controls 16, e.g., room. The card contents unique to each lock are encrypted first with a short key (denoted by SK-1; SK-2). The output of this process is referred to herein as a partial encrypted card payload. In one example, each short key (SK-1, . . . SK$_N$) for each associated lock is 24 bits in length.

The partial encrypted card payload is then further encrypted with a long term shared key (LK) providing the final encrypted card payload. In one example, the Long Term Shared Key (LK) is 128 bits in length. Due to the process of applying layers of encryption on the card payload, this approach may be referred to as an onion-layer encryption. Since this individual short key portion (SK1, SK2, . . . ) is different for each key/access control pair, one card compromise (knowing the long shared key) doesn't automatically lead to compromise of the other cards. Moreover, card space overhead is minimized with the onion layer approach.

Figure 3:
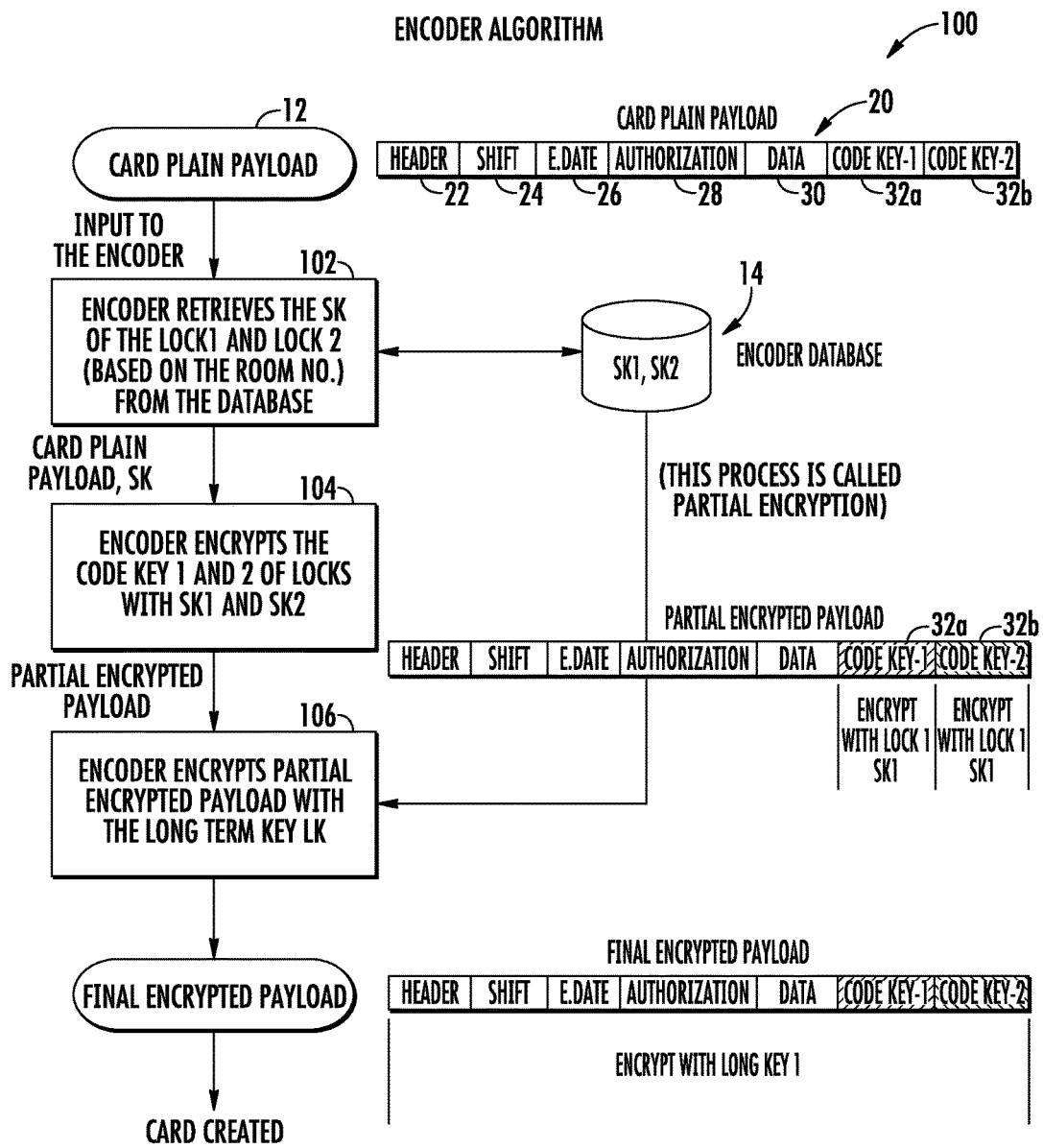
FIG. 3 is a flowchart of a method for encoding the magnetic strip card according to one disclosed non-limiting embodiment.

With reference to FIG. 3, a method 100 for encoding the magnetic strip card 12 is disclosed in terms of functional block diagrams. It should be appreciated that these functions may be enacted in either dedicated hardware circuitry or programmed software routines capable of execution in various microprocessor based electronics control embodiments of the encoder 14, and the plurality of access controls 16.

Initially, the magnetic strip card 12 includes a payload 20 that can include a header field 22, a shift field 24, an E. date field 26, an authorization field 28, a data field 30, and one or more code key fields 32A, 32B (two shown as CK1, CK2, but four possible with typical magnetic strip card storage space). It should be appreciated that various fields may alternatively or additionally be provided.

Next, in this example, the encoder 14 retrieves the short key SK1, SK2 (based on the room numbers) for Lock 1 and Lock 2 from the encoder database (step 102).

Next, the encoder encrypts the code key 1 32A and code key 2 32B for Lock 1 and Lock 2 with SK1 and SK2 (step 104). This process results in a partial encrypted payload.

Next, the encoder 14 encrypts the partial encrypted payload with a Long Term Key LK (step 106). This results in the Final Encrypted Payload on the magnetic strip card 12 which is then ready for use.

Figure 4:
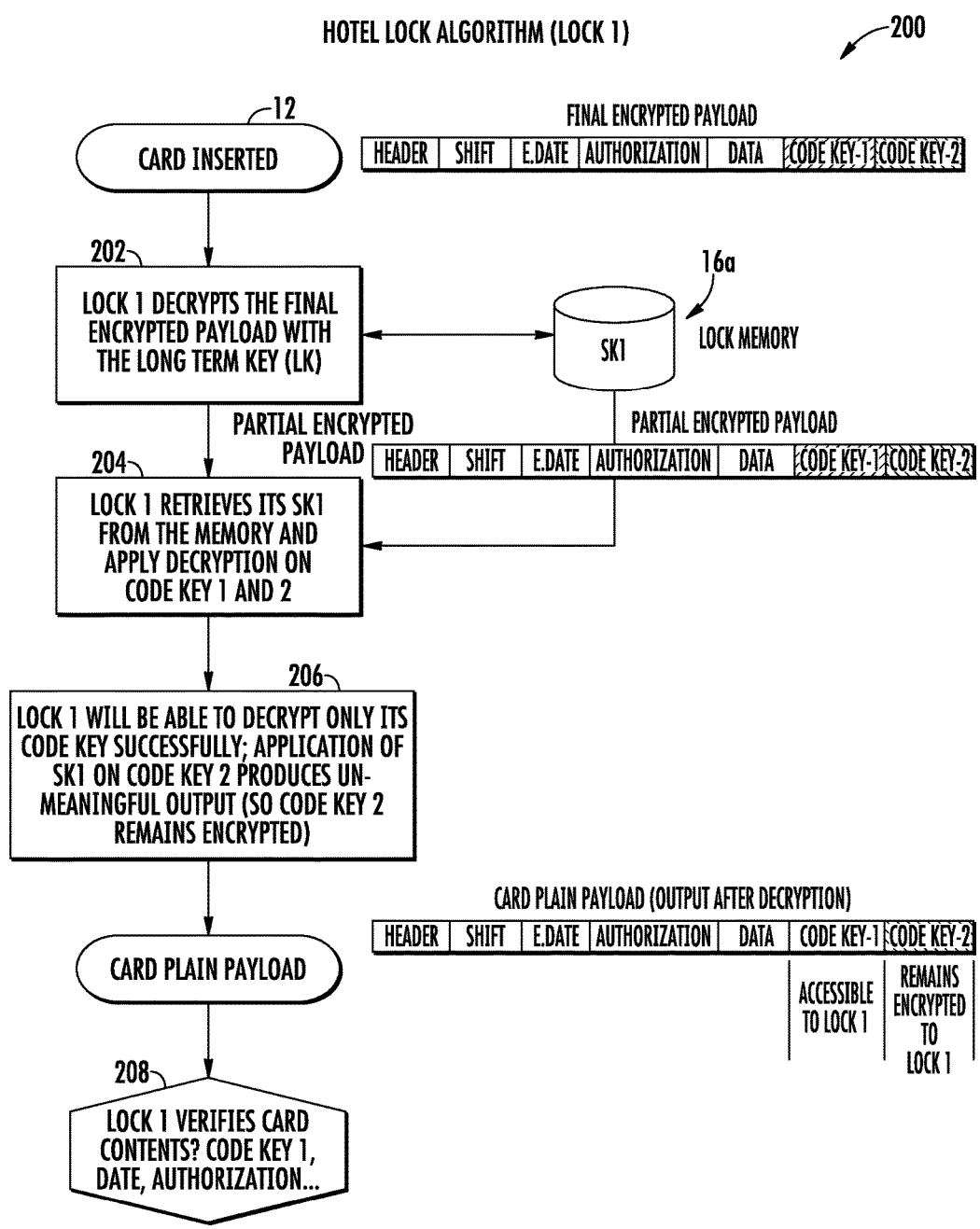
FIG. 4 is a flowchart of a method for opening example lock 1 with a magnetic strip card.

With reference to FIG. 4, a method 200 for opening an appropriate access control 16 (Lock 1 in this example) with the magnetic strip card 12 is disclosed in terms of functional block diagrams. Initially, the magnetic strip card 12 with the final encrypted payload is inserted into the appropriate access control 16.

Next, the access control 16A, e.g., lock 1, first decrypts the final encrypted payload with the Long Term Key (LK) (step 202). That is, the common key is decrypted to access SK1, SK2, etc.

Next, lock 1 retrieves SK1 from its memory and applies decryption to CK1 and CK2 (step 204). That is, lock 1 attempts to decrypt SK1, SK2, etc., subsequent to decryption of the Long Term Key (LK). Lock 1 will then be able to decrypt only its own Code Key (CK1) successfully (step 206). The application of SK1 to Code Key 2 produces un-meaningful output and Code Key 2 thus remains encrypted. Likewise, should the magnetic strip card 12 be used to access Lock 2, the application of SK 2 to Code Key 1 produces un-meaningful output and Code Key 1 thus remains encrypted.

Finally, the card plain payload is accessible to Lock 1 to unlock Lock 1 and perform verification, recordation steps such as Date, Authorization, etc (step 208).

The method of applying layers of encryption on the card payload offers a security level greater than current strong-encrypted magnetic strip cards that only uses a single global key. The low card space overhead of this method also enables the use of the ubiquitous and inexpensive magnetic strip cards, which alleviates the requirement to switch from magnetic strip cards to smart cards with large payload space. This thus saves significant cost since magnetic strip cards are much less expensive than smart cards.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed:

1. A magnetic strip card, comprising:
    a card payload with a code key of an access control encrypted with a short key to generate a partial encrypted card payload, the partial encrypted card payload encrypted with a long shared key to provide a final encrypted payload, the short key is 24 bits and the long shared key is 128 bits.

2. The magnetic strip card as recited in claim 1, wherein individual short key portion is different for each key/access control pair.

3. The magnetic strip card as recited in claim 2, wherein the final encrypted payload contains individual short key portions for four different key/access control pair.

4. The magnetic strip card as recited in claim 1, wherein the partial encrypted card payload is encrypted with a code key of an access control with the short key of the access control.

5. The magnetic strip card as recited in claim 1, wherein the access control is a lock.

6. The magnetic strip card as recited in claim 5, wherein the partial encrypted card payload is associated with a single lock.

7. The magnetic strip card as recited in claim 1, wherein the card payload comprises a header field, a shift field, an E. date field, an authorization field, a data field, and one or more code key fields.

8. The magnetic strip card as recited in claim 1, wherein the magnetic strip card is of less than several hundred bits.

9. A method for encoding a magnetic strip card of less than several hundred bits, the method comprising:
    encrypting a card payload with a code key of an access control with a short key of the access control to generate a partial encrypted payload, wherein the short key is 24 bits; and
    encrypting the partial encrypted payload with a long shared key to provide a final encrypted payload, wherein the long shared key is 128 bits.

10. The method as recited in claim 9, further comprising encrypting a card payload with a code key for each of a multiple of access controls with a respective short key of the access control to generate the partial encrypted payload.

11. The method as recited in claim 10, wherein the partial encrypted payload includes at least one code key.

12. The method as recited in claim 10, wherein the partial encrypted payload includes four code keys.

13. The method as recited in claim 10, wherein the partial encrypted payload includes a multiple of code keys.

14. A method for opening an appropriate access control with a magnetic strip card of less than several hundred bits, the method comprising:
    decrypting a final encrypted payload with the Long Term Key to access a partial encrypted payload; and
    decrypting the partial encrypted payload, wherein decrypting the partial encrypted payload includes applying a short key to a multiple of code keys.

15. The method as recited in claim 14, wherein applying the short key to the multiple of code keys is operable to decrypt only one access control code key successfully while the remainder of the multiple of code keys produces unmeaningful output such that the remainder of the code keys remain encrypted.

* * * * *